Patented June 18, 1935

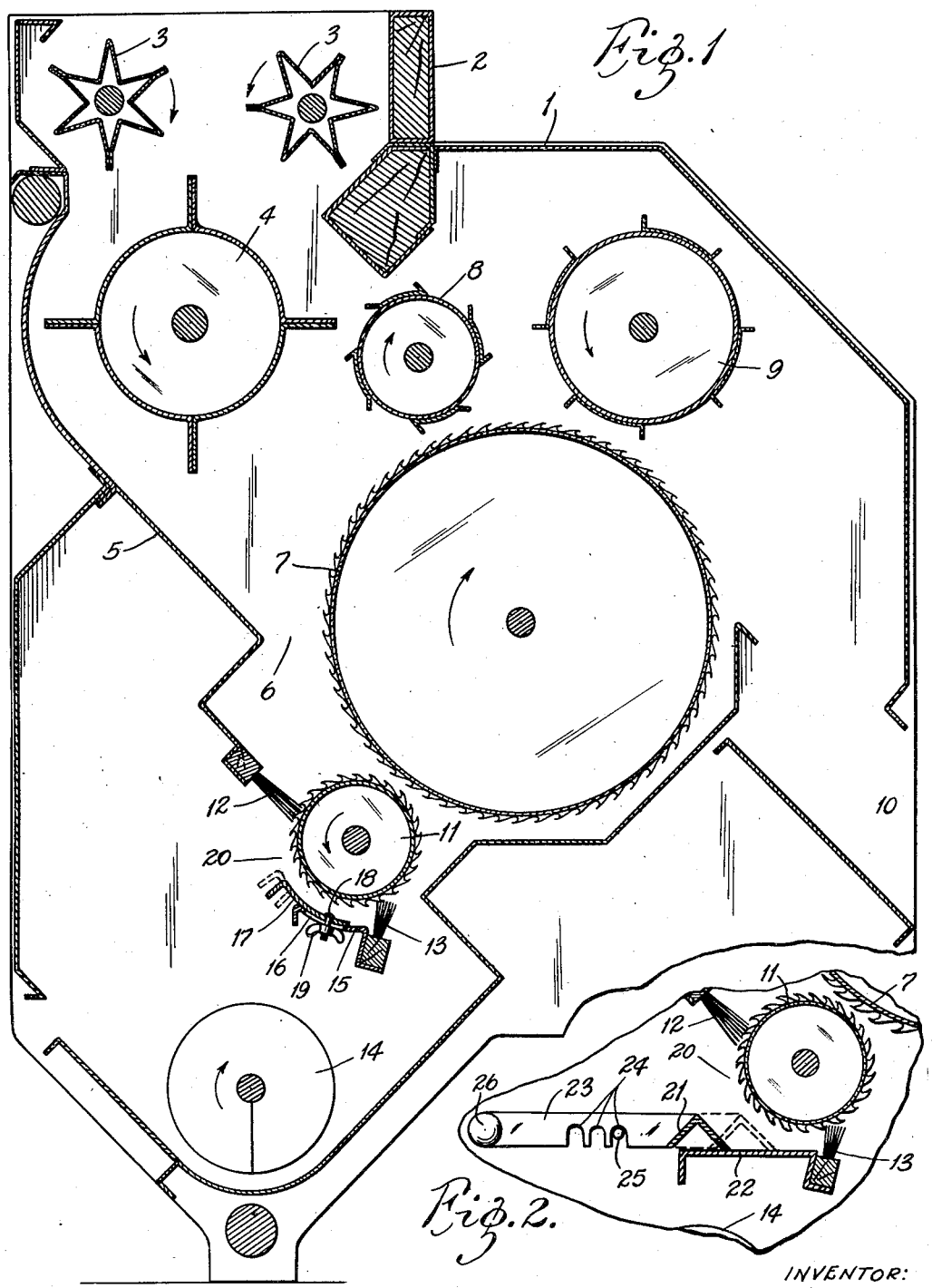

2,005,265

UNITED STATES PATENT OFFICE 2,005,265

COTTON CLEANING AND RECLAIMING MACHINE

John E. Mitchell, Dallas, Tex.

Application May 19, 1933, Serial No. 671,797

1 Claim. (Cl. 19—37)

This invention relates to certain new and useful improvements in cotton cleaning and reclaiming machines of the type disclosed in various patents heretofore granted to me, and particularly in Patent No. 1,613,242, dated January 4, 1927.

In such types of machines I employ a small reclaiming saw cylinder located below the hull discharge opening extending past the main saw cylinder, and located in sufficiently close proximity to said main saw cylinder to permit the latter to doff cotton from the reclaiming saw cylinder. Cooperating with the reclaiming saw cylinder are a number of yielding members, usually in the form of brushes, which permit hulls to be carried beneath them by the reclaiming saw cylinder, and to be thrown off by centrifugal action through the gaps between the brushes, while at the same time causing the small lock cotton to be engaged by the teeth of the saws of the reclaiming cylinder and carried around to be doffed by the main saw cylinder.

The successful operation of the reclaiming saw cylinder in recovering the small lock cotton passing by the main saw cylinder with the hulls and other refuse, is due to the fact that the hulls, being relatively hard, will not be engaged by the teeth of the saws, and the brushes will yield to permit of them passing under and being thrown off. On the other hand the lock cotton being softer than the hulls, will be engaged by the teeth of the saws when yieldably forced against the same by the cooperating brushes.

In the construction illustrated in the patent aforesaid, I employ three sets of yielding members, or brushes, positioned in spaced relation with reference to the outer circumferential portion of the reclaiming saw cylinder, each set of brushes, as will be understood, extending the entire length of the cylinder. These rows of brushes are indicated in the patent, respectively, by the reference numerals 13, 14 and 15.

The present invention relates to the provision of a hull discharge gap, adjustable in size, between two of the yielding members cooperating with the reclaiming saw cylinder, and in the illustrated embodiment of the invention shown in the accompanying drawing, consists, essentially, in substituting for the central row of brushes 14, illustrated in my said prior patent, means for providing a hull discharge gap, adjustable in size beyond the upper yielding member 13, relative to the direction of rotation of the reclaiming saw cylinder.

The provision of such a gap is rendered necessary, or at least highly desirable, by reason of the fact that the character of the cotton handled in different localities varies considerably with respect to the size of the locks and the percentage of hulls that must be separated, and the size of the hull discharge space between the yielding members 13 and 14 which would be adequate for one character of cotton, in practice has been found to be inadequate for the proper discharge of hulls when operated on another character of cotton.

On the other hand, if the space is large enough to meet the maximum requirements of hull discharge, it will permit the escape of too many locks of cotton when operating on cotton which is relatively clean.

To make this clear, it may be explained that during the early part of the ginning season, it is necessary to make it more difficult for cotton to escape through the hull discharge gap from the reclaiming saw cylinder, not only because the cotton is usually more valuable during the early part of the ginning season, and it is more important to avoid waste, but also because it contains less hulls and other foreign matter. It is, therefore, not so important to provide a very free and open discharge for hulls past the yielding members of the reclaiming saw cylinders. On the other hand, during the latter part of the ginning season, the cotton not only contains a very large percentage of hulls and other extraneous matter, but there are often present hard and other inferior locks of cotton which it is desirable to discharge with the hulls, and under such conditions it is important to widen or change the discharge gap following one or more of the yielding members so as to provide a free escape for the hulls and trash.

My invention is illustrated in the accompanying drawing, in which:

Figure 1 is a longitudinal sectional view through a cotton cleaning and reclaiming machine provided with my improvements; and Figure 2 is a similar view of the lower portion of said machine and illustrating a modification in the means for adjusting the size of the discharge gap.

Referring now to the drawing, the numeral 1 indicates the casing of the machine having a projection portion, 2, on its top affording an opening for receiving the bulk cotton, and in the opening of which projection are located feed rollers, 3. Located below the feed rollers is a beater, or distributing roller, 4, cooperating with an inclined hull board, 5, the lower end of which provides a discharge opening, 6, past the main saw cylinder, 7. Cooperating with the upper portion of the saw cylinder is a kicker roll, 8, and a doffer, 9, the doffed cotton being discharged through an opening, 10, into the gin, on which the machine is mounted. Rotatably mounted below the discharge opening 6, and adjacent to the lower side of the saw cylinder 7, is a small reclaiming saw cylinder, 11, cooperating with which are two yielding members or rows of brushes, 12, 13, supported in the casing in any suitable way, preferably by strips extending between and secured to the side walls of the casing. In the lower part of the casing is arranged a screw conveyor, 14, for discharging refuse from the casing of the machine. The parts indicated are all of conventional design, and need not be further described, except to say that the direction of rotation of the rotatable members is indicated by suitable arrows placed thereon. Located beneath the reclaiming saw cylinder 11, and concentric with the periphery thereof, is a curved stationary member, 15, provided with slots, 16. Slidably mounted on the member 15, is a similar curved member, 17, provided with bolts, 18, which extend through the slots 16, and have mounted thereon wing nuts, 19.

As will be readily apparent, by loosening the wing nuts 19, the member 17, may be moved outward to decrease the size of the gap between its end and the yielding member 12, or it may be moved inward, as indicated by dotted lines, to widen said gap.

In operation, the stream of hulls carrying a varying percentage of one-seed-lock cotton which falls through the space 6, between the hull board 5, and main extracting saw cylinder 7, falls onto the reclaiming saw cylinder 11, which, as shown by the arrows, rotates in the opposite direction from the main saw cylinder 7. As the hulls and locks of cotton are pulled under or through the brush or yielding member 12, the locks of cotton are forced into engagement with the teeth of the reclaiming saw. Most of the hulls are thrown out through the opening, 20, between the bottom of the yielding member 12, and the outer end of the adjustable member 17, and if this opening is not too wide, no cotton will be thrown out through the opening with the hulls. If, however, the cotton contains a very large percentage of hulls and other refuse, as well as hard and other inferior locks of cotton, which latter it is desirable to discharge with the hulls, then the member 17 may be adjusted inward as indicated by dotted lines to widen the gap 20, so as to permit of the free discharge of the hulls and inferior locks of cotton, the escape of which latter involves practically no loss whatever.

In the modified construction shown in Figure 2, I employ a bar, 21, preferably in the shape of an inverted V, which extends the full length of the reclaiming saw cylinder 11, and is parallel with the axis thereof. This bar is shown as resting upon a platform, 22, which may be utilized at one end for supporting the yielding member 13. Extending rearwardly from each end of the bar 21, is an arm, 23, provided on its under edge with a plurality of recesses, 24, one or the other of which may be moved into engagement with a pin, 25, projecting inward from the side wall of the casing. Each arm 23, is provided with a handle, 26. By grasping these handles and raising the arms 23, the bar 21, may be moved toward or from the reclaiming saw cylinder 11, and then held in its adjusted position by lowering it to bring one or the other of the corresponding recesses 24, into engagement with the pins 25. Other means for adjusting the bar 21, could of course be provided.

In this form of the invention, adjustment of the bar 21, does not change the width of the hull discharge gap 20, following the yielding member 12, so much as does the adjustment of the curved member 17, of Fig. 1; but when the bar 21, is moved inward to its closest point of proximity to the reclaiming saw cylinder 11, as shown by the dotted lines, it provides a freer discharge of hulls and trash than obtains with a corresponding adjustment of the member 17. At the same time, when it is adjusted in a direction away from the reclaiming saw cylinder, or to the position shown in full lines in Figure 2, the hulls must be thrown over the bar; and since cotton cannot be thrown that far, even if it should fall loose from the teeth of the saws after being brushed on by the yielding member, any material waste can readily be avoided even when handling the cleanest or smallest-lock cotton, with only a small percentage, if any, of hulls to contend with. When the percentage of hulls in the cotton is very large, and there is no objection to occasionally wasting a small lock of cotton, the bar 21 can then be adjusted to a position close to the reclaiming saw cylinder, as shown by the dotted lines.

I wish it understood that my invention is not limited to use in the particular arrangement of parts illustrated, but that it involves, broadly, the idea of providing a discharge gap adjustable in size in connection with a reclaiming saw cylinder, whether the same be arranged in cooperative relation with a yielding member, such as 12, or otherwise.

I wish it also understood that the combination, in its broad aspects, is not limited to doffing the cotton from the reclaiming saws by the main saw cylinder. I may use a separate doffing cylinder for this purpose, as shown in my patent referred to, or I may employ any other preferred means, or arrangement for doffing the cotton from the reclaiming saw cylinder.

I claim:

In a cotton cleaning and reclaiming machine having a main cotton extracting saw cylinder and providing a discharge opening past the cylinder for the escape of hulls, and small lock cotton not engaged by the saws, a reclaiming saw cylinder positioned below said opening, a yielding member cooperating with said reclaiming saw cylinder and a curved rigid member substantially concentric with the periphery of said reclaiming saw cylinder and one side of which forms with said yielding member a hull-discharge gap for said reclaiming saw cylinder, means for circumferentially adjusting said curved member relative to said yielding member to vary the size of said discharge gap, and means for doffing cotton from said reclaiming saw cylinder.

JOHN E. MITCHELL.